T. COOK.
ICE AND REFRIGERATING-MACHINE.

No. 192,234.

3 Sheets—Sheet 1.

Patented June 19, 1877.

3 Sheets—Sheet 2.
T. COOK.
ICE AND REFRIGERATING-MACHINE.
No. 192,234. Patented June 19, 1877.
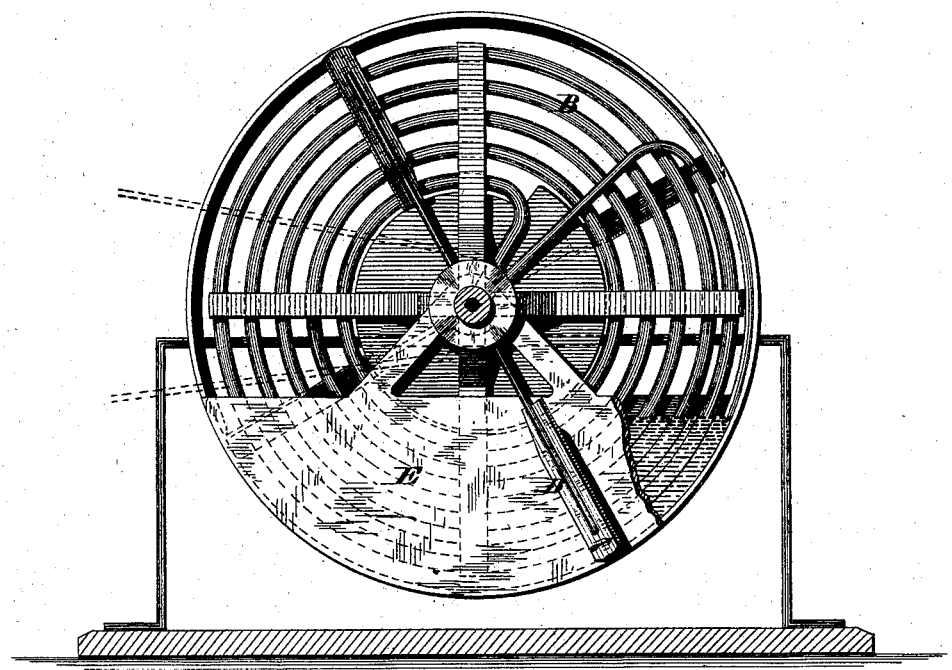
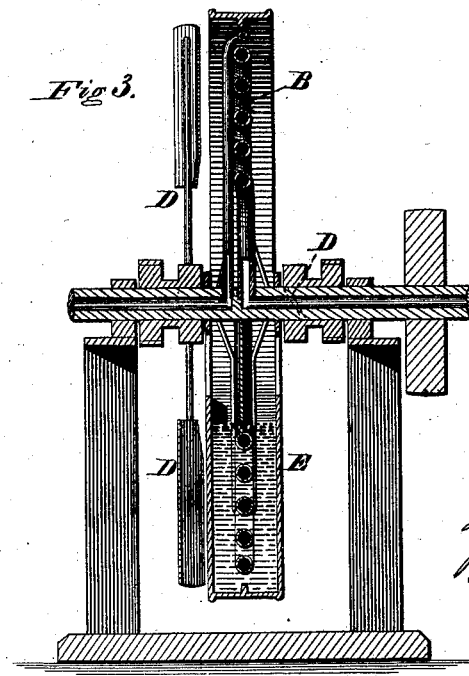

3 Sheets—Sheet 3.

T. COOK.
ICE AND REFRIGERATING-MACHINE.

No. 192,234. Patented June 19, 1877.

Witnesses. Inventor:
Harry King Thomas Cook
By Hill & Ellsworth
His Atty

UNITED STATES PATENT OFFICE.

THOMAS COOK, OF PHILADELPHIA, PENNSYLVANIA.

IMPROVEMENT IN ICE AND REFRIGERATING MACHINES.

Specification forming part of Letters Patent No. 192,234, dated June 19, 1877; application filed May 17, 1877.

*To all whom it may concern:*

Be it known that I, THOMAS COOK, of Philadelphia, in the county of Philadelphia and State of Pennsylvania, have invented certain new and useful Improvements in Refrigerating and Ice-Making Machinery; and I do hereby declare the following to be a full, clear, and exact description of the same, reference being had to the accompanying drawings, forming part of this specification, in which—

Figure 1:
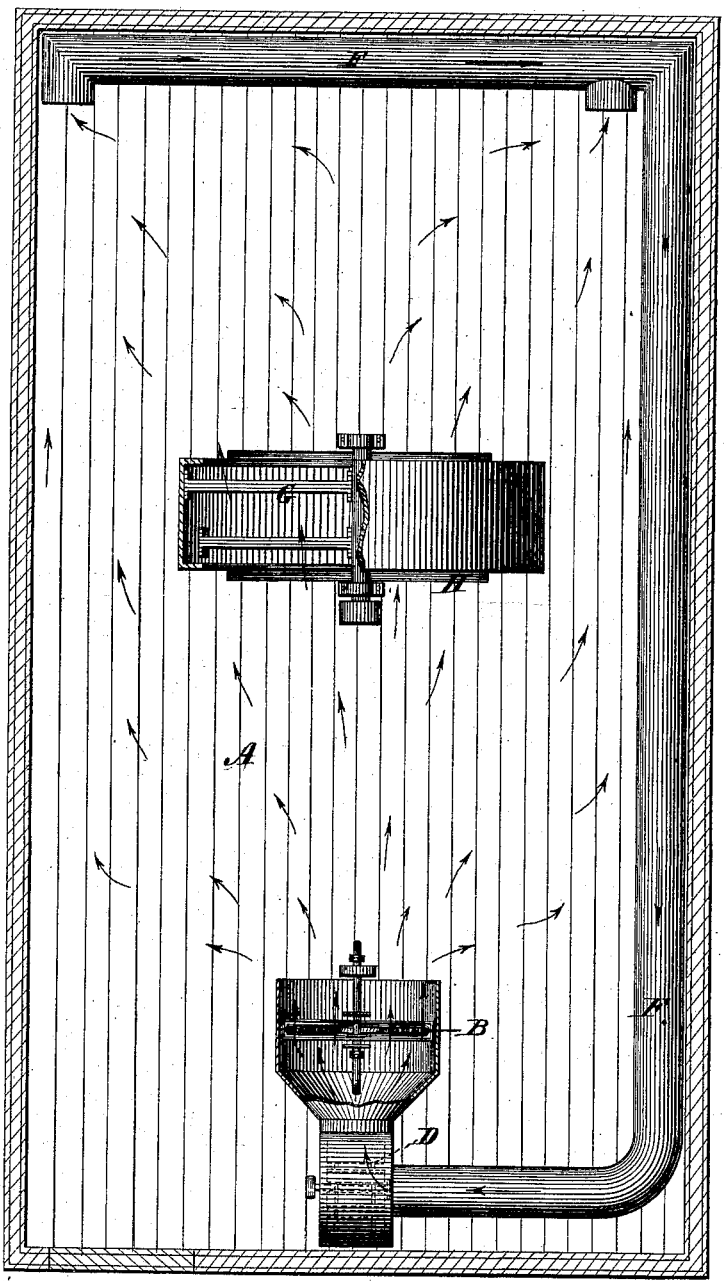
Figure 4:
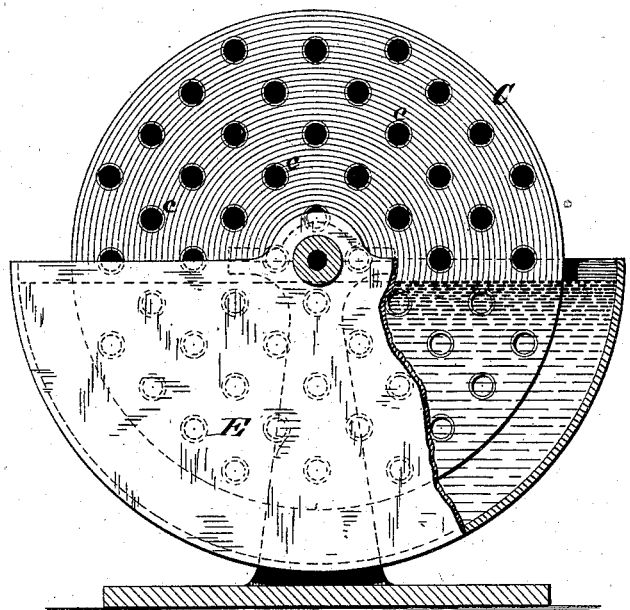
Figure 5:
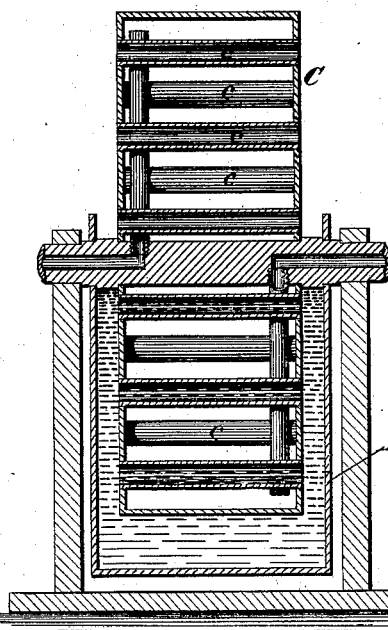

Figure 1 is a plan view of the chamber with views, partly in section, of the machinery therein employed. Fig. 2 is a side elevation of the air-refrigerating machine, with a portion of the tank shown in section. Fig. 3 is a vertical section of the parts shown in Fig. 2, one of the fans being removed; and Figs. 4 and 5 are modifications of the refrigerating-wheel.

Similar letters of reference in the accompanying drawings denote the same parts.

The object of this invention is to so improve the processes and means for artificially producing cold that the production can be greatly increased and the cost reduced as compared with the processes and means now known. To this end the invention consists, first, in the process of cooling air-currents by passing them in contact with the surface of a refrigerating coil or vessel, which is kept moistened with an incongealable liquid; secondly, in the process of making ice by means of such refrigerated air-currents acting upon water in a closed chamber; and, thirdly, in the mechanism and combinations thereof by which these processes are carried into practice, substantially as I will now proceed to set forth.

In my process of cooling air I employ any kind of movable or stationary coil or vessel through which a refrigerant circulates, so that its surface will absorb latent heat rapidly from the air-currents impinging against it. Against the surface of such refrigerating coil or vessel I blow air-currents, by any suitable means whereby they will be caused to move in close contact with it, so as to lose, to the maximum extent, their latent heat; and I keep the refrigerated surfaces, against which the air-currents impinge, moist with brine or other incongealable liquid, in order that frost and snow may not form on the refrigerating-surface and interfere with its action, as would otherwise be the case. By this process I am able to reduce the temperature throughout a large compartment, such as the interior of a car or building or the hold of a ship, to less than 20° Fahrenheit. I therefore, for ice-making purposes, arrange my air-cooling mechanism within a large closed compartment, and therein combine with it vessels containing water, or a wheel revolving in contact with water, or any surface upon which water is sprayed, whereby ice is formed, not on the refrigerating-surface, nor by means of a non-congealable fluid cooled by such surface, but by reducing the temperature of the air contained in the entire compartment, in the manner hereinabove set forth.

Having thus described my improved processes, I will now proceed to describe the means which I prefer for carrying them into practice.

In the drawings, A indicates a large closed compartment, such as the hold of a ship or the interior of a building, where the air is to be refrigerated for preserving articles of food, or for other purposes, or where the manufacture of ice is to be carried on. Within this compartment I arrange a slowly-revolving wheel, B, which is hollow, and forms part of a continuous refrigerating apparatus, wherein the expansion of gases or the vaporization of liquids absorbs heat, said gases or vapor being afterward condensed by cold, pressure, or other means, and returned to the wheel again, substantially on the principle of my invention shown in Letters Patent No. 171,267, dated December 21, 1875. Through the intertubular spaces of this wheel I blow air by means of a rapidly-revolving fan-wheel, D, and the fans may be arranged on opposite sides of the wheel, if preferred, in order to drive the air back and forth, and subject it to the full effect of the wheel. The cylindrical wheel C, Figs. 4 and 5, having the tubular air-passages *c c*, is in every respect the equivalent of the wheel B. The air-currents thus driven through the open wheel will, unless means be taken to prevent it, almost instantly deposit a coating of snow upon the surfaces which they impinge against, and, so rapid is the production of the snow, that, by means of a brush acting quickly upon the surface of the wheel, a miniature snow-storm may be caused, or, if water be sprayed in drops on the wheel, a hail-storm of the same extent may be produced.

This snow is, however, a poor conductor of heat, and interferes materially with the action of the apparatus, and, as brushing will not entirely remove it, and is, besides, inconvenient and expensive, I cause the wheel to dip into a trough, E, of salt-brine, or other incongealable liquid, which keeps its surface continually damp and prevents all deposition of snow or frost thereon. With this arrangement, the air-currents are rapidly cooled, and the temperature of a large compartment can be reduced below 20° Fahrenheit, if desired.

For use on shipboard I suspend the brine-receptacle under the wheel, as shown in Figs. 2, 3, 4, and 5, so that the liquid will not be swashed out by the motion of the ship.

In order to more effectually move the entire mass of air in the compartment and render the temperature throughout the room more uniform, I sometimes arrange the fan, as shown in Fig. 1, at one end of the chamber, with a suction-pipe, F, leading therefrom around to the other end.

For simply preserving meats, vegetables, &c., and for other purposes not requiring a reduction of the temperature below 32° Fahrenheit, the refrigerating coil, wheel, or vessel, with the fan or fans and the non-congealable liquid for moistening the refrigerating-surface, arranged within a closed chamber, will answer all requirements, and by means of them the temperature may be varied at will, or retained permanently at any desired degree below the normal temperature of the outside air. But when the chamber is to be used for making ice, a proper apparatus for supplying water to be frozen, and subjecting it to the action of the low temperature of the room, is to be arranged within the compartment, and for this purpose I prefer to use a slowly-revolving wheel, or series of wheels, G, having their lower edges dipping into a tank or tanks, H, of water, as shown in Fig. 1. The low temperature of the room causes the thin films of water taken up by the wheels to freeze in successive superimposed layers, until each ice-wheel is coated with a heavy mass of ice of great solidity and crystalline purity. If preferred, a current of cold air from the fans may, by suitable connecting-pipes, be carried to the interior of the ice-wheels, to increase their action, though this is not at all necessary.

While regarding the apparatus hereinabove described as the most economical and advantageous for the purpose, yet I do not consider my process-inventions as limited to such forms of apparatus, nor do I consider the principle of the combinations as limited to the specific forms shown. The air-currents may be produced by any competent means, and may be directed against, through, or around the wheel, vertically, horizontally, or obliquely. The wheel may rotate in a horizontal or inclined plane, or a stationary refrigerating-surface may be substituted, in which latter case a casing may be employed to keep the currents in contact with it, and they may be made to travel sinuously around or over it, and the surface may be wet with spray of brine. The water may be frozen in pans, or tanks, or on flat or inclined surfaces, where it falls in the form of spray, in lieu of employing the ice-wheel. If not emptied, the water in the ice-wheel tank will sometimes freeze four or five inches thick in a single night when the wheel is not in operation.

I claim as my invention—

1. The combination of a hollow revolving refrigerating-wheel with a vessel of incongealable liquid for washing or wetting its surface, and a fan for blowing air against it, substantially as described.

2. The combination of a swinging tank of incongealable liquid with the refrigerating-wheel and the fan, substantially as described.

3. The combination of a refrigerating-wheel and wetting apparatus with two fans on opposite sides to blow the air in contrary directions against it, substantially as described.

4. The combination of the revolving refrigerating-wheel B and fan-wheel D blowing air through it, as described, with the closed chamber A and the air-pipe F extending from the suction-opening of the fan-box to the opposite end of the chamber A, substantially as described.

5. The combination, in a closed chamber, A, of the revolving air-refrigerating wheel B and the fan D with a revolving ice-wheel, G, and means for supplying water to be congealed thereon, substantially as described.

THOS. COOK.

Witnesses:
THEO. MUNGEN,
FRANK McKENNY.